United States Patent [19]
Mitobe et al.

[11] Patent Number: 6,110,524
[45] Date of Patent: Aug. 29, 2000

[54] METHOD OF FORMING LUBRICANT LAYER ON MAGNETIC DISC, DEVICE FOR FORMING LUBRICANT LAYER THEREON, AND MAGNETIC DISC

[75] Inventors: Yoshihiro Mitobe, Higashine; Eishin Yamakawa, Kawasaki; Ichiro Kobayashi, Kawasaki; Takuya Tomoi, Kawasaki, all of Japan

[73] Assignee: Fujitsu Limited, Kawasaki, Japan

[21] Appl. No.: 09/206,492

[22] Filed: Dec. 7, 1998

[30] Foreign Application Priority Data

Mar. 19, 1998 [JP] Japan .................................. 10-70360

[51] Int. Cl.$^7$ ...................................................... B05D 5/12
[52] U.S. Cl. ...................... 427/130; 427/131; 427/385.5; 427/430.1; 428/65.4; 428/65.8; 428/694 TF; 428/694 TP; 428/695

[58] Field of Search ..................................... 427/127–132, 427/548, 599, 385.5, 430.1; 428/65.4, 65.8, 694 TP, 694 TF, 695

*Primary Examiner*—Bernard Pianalto
*Attorney, Agent, or Firm*—Greer, Burns & Crain, Ltd.

[57] ABSTRACT

In the method of the present invention, lubricant layers of magnetic discs, which have fixed thickness, can be formed by volatilizing solvent. The method of forming the lubricant layer on the magnetic disc, comprises the steps of: dipping the magnetic disc into a solution in which the lubricant is diluted with the volatile solvent; taking out the magnetic disc from the solution; and volatilizing the volatile solvent from a surface of the magnetic disc, wherein a layer of specific liquid, whose specific gravity is less than that of the solution and which is less volatile and insoluble in the solution, is formed on a surface of the solution.

3 Claims, 5 Drawing Sheets

METHOD OF FORMING LUBRICANT LAYER ON MAGNETIC DISC, DEVICE FOR FORMING LUBRICANT LAYER THEREON, AND MAGNETIC DISC

BACKGROUND OF THE INVENTION

The present invention relates to a method of forming a lubricant layer on a magnetic disc, a device for forming the lubricant layer thereon, and a magnetic disc.

A magnetic disc is made by coating a magnetizable material on surfaces of a circular disc, which is made of aluminum, glass, etc., and it constitutes a part of a magnetic disk unit, which is a data recording device. The magnetic disc is attached to a rotary shaft and rotated at high speed. A magnetic head is held by a carriage mechanism and loaded on the surface of the magnetic disc. The magnetic disc is slightly floated by an air stream caused by the high speed rotation of the magnetic disc. In this state, the magnetic head is moved in the radial direction of the magnetic disc to read data recorded on the magnetic disc.

A basic structure of the magnetic disc is shown in FIG. 4. Magnetizable layers 54 are respectively formed on both surfaces of a disc 52; and carbon layers 56, whose thickness is about 10 nm, are respectively formed on the surfaces of the magnetizable layers 54 so as to protect the magnetizable layers 54 when the magnetic head contacts the magnetizable layers 54. Further, lubricant layers 58, whose thickness is less than 10 nm, are respectively formed on the surfaces of the carbon layers 56 so as to smoothly start and stop the magnetic head, which contacts the surface of the magnetic disc 50, and so as to protect the surfaces of the magnetic disc 50. In the present explanation, the disc 52, on which the carbon layers 56 are formed without the lubricant layers 58, is called the magnetic disc 50.

Conventionally, the lubricant layers 58 are formed by several methods. For example, as shown in FIG. 5, a solution 60, in which a lubricant is diluted with volatile solvent, is reservoired in a container 62, and a magnetic disc 50 is dipped into the solution 60. Then, the magnetic disc 50 is taken out from the solution 60 at fixed speed. By taking out at fixed speed, prescribed amount of the solution 60 can be stuck on surfaces of the magnetic discs 50. The solvent in the solution 60 stuck on the surfaces of the magnetic disc 50 volatilizes when the surfaces are exposed in the air, so only the lubricant is left on the surfaces, and the lubricant layers 58 can be formed on the magnetic disc 50. This method is called a dip-method.

Another method, in which the lubricant layers are formed as well as the dip-method, is shown in FIG. 6. The solution 60, which has been reservoired in a tank 64, is supplied into the container 62, in which the magnetic disc 50 has been accommodated, by a pump 66, and the solution 60 in the container 62 can be discharged and returned to the tank 64. While discharging the solution 60 from the container 62, the surface of the solution layer 60 is descended at fixed speed to gradually expose the magnetic disc 50. Then, the magnetic disc 50 is taken out, so that the lubricant layers 58 can be formed thereon. This method is called a surface descent-method.

In the methods, PFPE (per fluoro polyethers) is usually used as the lubricant; PFPE whose density is different from that of said lubricant, PFC, HFE and FC are usually used as the volatile solvent. Usually, one of them is selected as the volatile solvent.

However, in the conventional methods of forming the lubricant layers on the magnetic disc 50, the solvent volatilizes from not only the solution on the magnetic disc but also the solution in the container, so amount of the solvent in the solution is naturally reduced. To maintain the density of the lubricant in the solution, the solvent must be continuously added. But it is difficult to correctly know the present density of the lubricant because of continuously adding the solvent, so that the density of the lubricant cannot be precisely controlled and thickness of the lubricant layers of the magnetic discs must be dispersed. To maintain the thickness of the lubricant layers in a predetermined range, the thickness must be examined twice: after the steps of dipping and post baking. So the working efficiency must be low.

SUMMARY OF THE INVENTION

The present invention is invented to solve the problems of the conventional methods. Objects of the present invention are to provide a method and a device for forming a lubricant layer on a magnetic disc, which is capable of securely forming the lubricant layer having prescribed thickness by volatilizing a solvent, and a magnetic disc in which the lubricant layer has prescribed thickness.

To achieve the objects, the method of forming a lubricant layer on a magnetic disc, comprises the steps of: dipping the magnetic disc into a solution in which a lubricant is diluted with volatile solvent; taking out the magnetic disc from the solution; and volatilizing the volatile solvent from a surface of the magnetic disc, wherein a layer of specific liquid, whose specific gravity is less than that of the solution and which is less volatile and insoluble in the solution, is formed on a surface of the solution.

In the method, the specific liquid may be pure water. The specific gravity of the pure water is less than that of the solution, and the pure water is less volatile and insoluble in the solution. The pure water is well repelled by the lubricant, so the pure water can be perfectly removed from the magnetic disc while the magnetic disc is taken out from the solution.

The device for forming a lubricant layer on a magnetic disc by the steps of: dipping the magnetic disc into a solution in which a lubricant is diluted with volatile solvent; taking out the magnetic disc from the solution; and volatilizing the volatile solvent from a surface of the magnetic disc, comprises: a container in which the solution is reservoired and a layer of specific liquid, whose specific gravity is less than that of the solution and which is less volatile and insoluble in the solution, is formed on a surface of the solution; and conveying means for dipping the magnetic disc into the solution via the layer of the specific liquid and taking out the magnetic disc from the solution via the layer of the specific liquid.

The device may further include: a tank in which the solution unused is reservoired; supplying means for supplying the solution unused from the tank to the container; level detecting means for detecting a level of the solution in the container; and control means for controlling the level of the solution on the basis of the level thereof detected by the level detecting means, the control means supplying the solution unused into the container by the supplying means so as to make the level of the solution close to a predetermined standard level. With this structure, the liquid level of the solution in the container can be automatically maintained.

And, the device may further include: a first tank in which the lubricant unused is reservoired; a second tank in which the solvent unused is reservoired; first supplying means for supplying the lubricant unused from the first tank to the container; second supplying means for supplying the solvent unused from the second tank to the container; level detecting means for detecting a level of the solution in the container; density detecting means for detecting density of the lubricant in the solution; and control means for controlling the density of the lubricant on the basis of the density thereof detected by the density detecting means and controlling the level of the solution on the basis of the level thereof detected by the level detecting means, the control means supplying the lubricant unused and/or the solvent unused into the container by the first supplying means and/or the second supplying means so as to make the density of the lubricant close to predetermined standard density and so as to make the level of the solution close to a predetermined standard level. With this structure, the liquid level of the solution in the container and the density of the lubricant in the solution can be automatically maintained.

Another device of the present invention is a device for forming a lubricant layer on a magnetic disc by the steps of: dipping the magnetic disc into a solution in which a lubricant is diluted with volatile solvent; taking out the magnetic disc from the solution; and volatilizing the volatile solvent from a surface of the magnetic disc, comprises: a container accommodating the magnetic disc; a tank in which the solution and specific liquid, whose specific gravity is less than that of the solution and which is less volatile and insoluble in the solution, are reservoired; supplying-and-discharging means for supplying the solution and the specific liquid into the container so as to dip the magnetic disc into the solution and taking out the magnetic disc from the solution after a layer of the specific liquid is formed on a surface of the solution.

A magnetic disc of the present invention, which is processed by the steps of: dipping the magnetic disc into a solution in which a lubricant is diluted with volatile solvent; taking out the magnetic disc from the solution; and volatilizing the volatile solvent form a surface of the magnetic disc, is characterized by: forming a layer of specific liquid, whose specific gravity is less than that of the solution and which is less volatile and insoluble in the solution, on a surface of the solution; and dipping the magnetic disc into the solution via the layer of the specific liquid and taking out the magnetic disc from the solution via the layer of the specific liquid.

Another method comprises the steps of: dipping the magnetic disc into a solution in which a lubricant is diluted with volatile solvent; taking out the magnetic disc from the solution; and volatilizing the volatile solvent from a surface of the magnetic disc, and said method is characterized by: detecting density of the lubricant in the solution; and supplying the lubricant and/or the solvent into the solution so as to make the density of the lubricant close to predetermined standard density.

Another device for forming a lubricant layer on a magnetic disc by the steps of: dipping the magnetic disc into a solution in which a lubricant is diluted with volatile solvent; taking out the magnetic disc from the solution; and volatilizing the volatile solvent from a surface of the magnetic disc, comprises: a container in which the solution is reservoired; conveying means for dipping the magnetic disc into the solution in the container and taking out the magnetic disc from the solution; a first tank in which the lubricant unused is reservoired; a second tank in which the solvent unused is reservoired; first supplying means for supplying the lubricant unused from the first tank to the container; second supplying means for supplying the solvent unused from the second tank to the container; density detecting means for detecting density of the lubricant in the solution; and control means for controlling the density of the lubricant on the basis of the density thereof detected by the density detecting means, the control means supplying the lubricant unused and/or the solvent unused into the container by the first supplying means and/or the second supplying means so as to make the density of the lubricant close to predetermined standard density.

In the present invention, the layer of the specific liquid, whose specific gravity is less than that of the solution and which is less volatile and insoluble in the solution, is formed on the surface of the layer of the solution, so volatilizing the solvent is restricted and the density of the lubricant in the solution can be maintained. By maintaining the density of the lubricant, the thickness of the lubricant layers of the magnetic discs can be fixed. Amount and number of supplying additional solvent can be reduced, so the density of the lubricant can be easily and economically maintained. As described above, volatilizing the solvent can be restricted, so the present invention can prevent environmental disruption: destruction of the ozone layer and global warming. Namely, the present invention contributes to environmental protection. Dusts, impurities in the lubricant, etc. are resolved in the specific liquid, so that, the surface of the magnetic disc can be cleaned before forming the lubricant layers; quality of the magnetic disc can be improved; high purity of the solvent can be maintained; and the density of the lubricant can be easily and economically controlled.

In the case of making the density of the lubricant in the solution close to the standard density, the lubricant and/or the solvent are automatically supplied, so the density of the lubricant therein can be maintained even if the solvent volatilizes. The thickness of the lubricant layers of the magnetic discs can be easily fixed.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Figure 1:
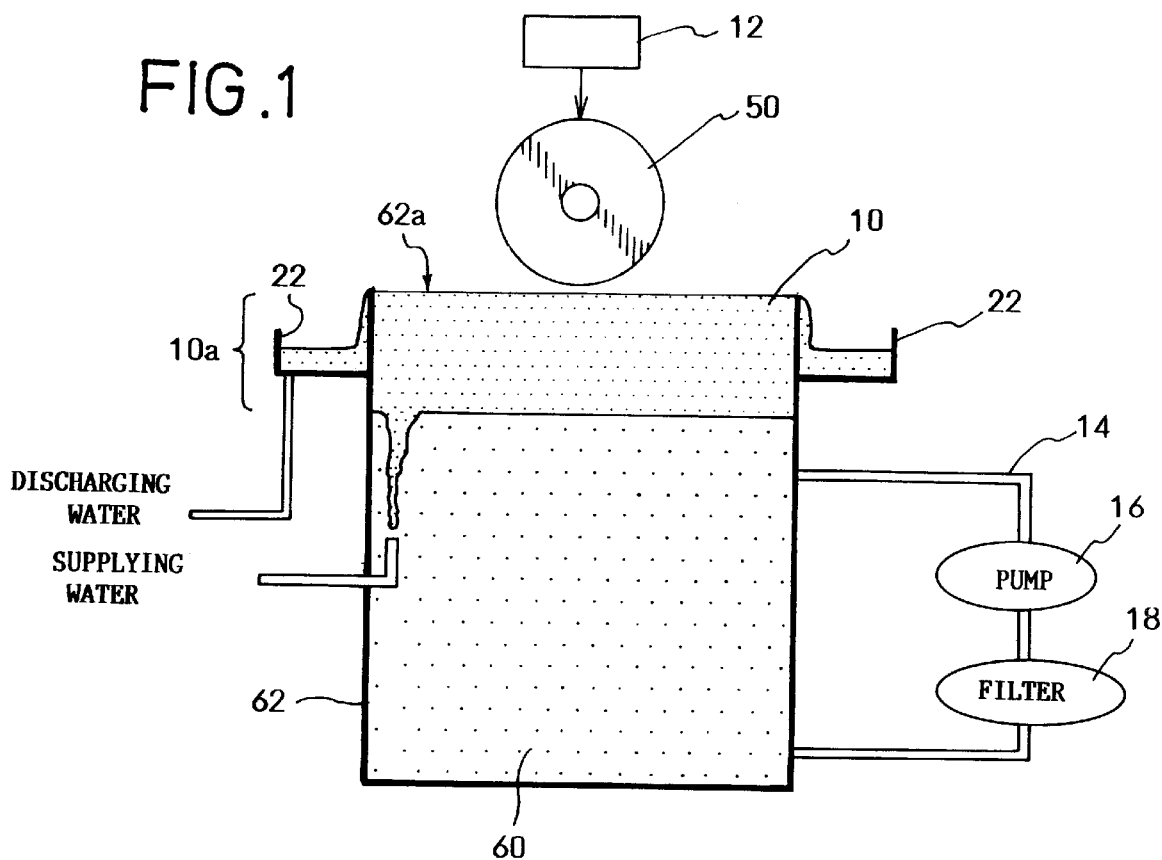
FIG. 1 is an explanation view of a device of a first embodiment of the present invention.

Preferred embodiments of the present invention will now be described in detail with reference to the accompanying drawings.

In the following embodiments, lubricant layers on a magnetic disc formed by the steps of: dipping the magnetic disc into a solution in which a lubricant is diluted with volatile solvent; taking out the magnetic disc from the solution; and volatilizing the volatile solvent from a surface of the magnetic disc, as well as the conventional dip-method and the conventional surface descent-method. Note that, in the following description, the words "taking out the magnetic disc from the solution" means both of the methods: the dip-method, in which the magnetic disc is upwardly pulled out from the solution; and the surface descent-method, in which the magnetic disc is exposed by descending the level of the solution.

First Embodiment

To form the lubricant layers 58, which have prescribed thickness, on the magnetic disc 50, density of the lubricant should be maintained within a prescribed range. To maintain the density thereof, volatilizing the solvent from the solution should be restricted.

Firstly, a method of forming the lubricant layers on the magnetic disc 50 will be explained with reference to FIG. 1.

The solution 60, in which the lubricant is diluted with the volatile solvent, is reservoired in a container 62. Then, a specific liquid 10, whose specific gravity is less than that of the solution 60 and which is less volatile and insoluble in the solution 60, is also reservoired in the container 62. Pure water, which includes no impurities, can be preferably employed as the specific liquid 10, so the pure water is employed in the present embodiment. And, the conventional lubricant and the conventional solvent are also employed in the present embodiment.

Since the specific gravity of the pure water 10 in the container 62 is less than that of the solution 60, the pure water 10 floats over a layer of the solution 60. Namely, a layer 10a of the pure water 10 covers over the surface of the layer of the solution 60.

The pure water 10 of the layer 10a is less volatile, so that it causes no air pollution. And the pure water 10 is insoluble in the solution 60. Namely, the solution 60 is insoluble in the layer 10a, so that volatilizing the solvent from the surface of the layer of the solution 60 is restricted. Therefore, in the present embodiment, change of the density of the lubricant in the solution 60 is much less than that of the conventional method in which the solvent always volatilizes from the surface of the solution.

The magnetic disc 50 is dipped into the solution via the layer 10a, then the magnetic disc 50 is taken out from the solution, at fixed speed, via the layer 10a, the lubricant layers can be formed on the surfaces of the magnetic disc 50 without changing the density of the lubricant in the solution, and the thickness of the lubricant layers formed on the magnetic discs 50 can be fixed.

The magnetic disc 50 is dipped into the solution via the layer 10a, but carbon layers have been already formed on the surfaces of the magnetic disc 50. The carbon layers are less wettable with water at angle of 70°; the carbon layers are wettable with the solution 60 (the solvent) at angle of 10° or less. When the magnetic disc 50 is dipped into the solution, the magnetic disc 50 once touches the pure water 10 of the layer 10a, but the pure water 10 immediately leaves from the surfaces of the magnetic disc 50 when the magnetic disc 50 reaches the solution 60, so that the magnetic disc 50 can completely touch the solution 60.

When the magnetic disc 50 is taken out from the solution 60 (the magnetic disc 50 is pulled out in the dip-method; the solution 60 is discharged from the container 62 in the surface descent-method), the magnetic disc 50 is passed through the layer 10a. So the pure water 10 touches the surfaces of the magnetic disc 50, but the surfaces of the magnetic disc, which are coated with the carbon layers and the solution 60, are much less wettable at angle of 90°, so that no water is left of the surfaces. Thus, the solvent in the solution 60 uniformly volatilizes from the whole surfaces of the magnetic disc 50, so the lubricant layers are uniformly formed on the surfaces.

A device for executing the above described method of forming the lubricant layers will be explained with reference to FIG. 1. Note that the elements described in the explanation of the method are assigned the same numeric symbols and explanation will be omitted. The device executes the dip-method.

The device basically comprises: the container in which the solution 60 is reservoired and the layer 10a of the specific liquid 10, e.g., the pure water, is formed on the surface of the solution layer 60; and conveying means 12 for conveying the magnetic disc 50, dipping the magnetic disc 50 into the solution 60 reservoired in the container 62 and vertically taking out the magnetic disc 50 from the solution 60. For example, the magnetic disc 50 is vertically accommodated in a basket, and the magnetic disc 50 is held by a supporting rod, which is pierced through a center hole of the magnetic disc 50. The conveying means 12 conveys the magnetic disc 50, which has been accommodated in the basket and held by the supporting rod.

In some cases, dusts and impurities, which have been stuck on the surfaces of the magnetic disc 50, invade the solution 60 and the pure water 10 when the magnetic disc 50 is dipped thereinto. If the step of dipping the magnetic disc 50 is repeated many times, the solution 60 and the pure water 10 will be polluted and quality of the magnetic discs 50, on which the dusts and the impurities are stuck again, will be worse.

In the present embodiment, a cleaning mechanism capable of making the solution 60 and the pure water 10, which are in the container 62, clean to reuse. Next, the cleaning mechanism will be explained.

Firstly, a unit for cleaning the solution 60 will be explained with reference to FIG. 1.

The container 62 has a circulating path 14, in which the solution 60 is circulated and impurities in the solution 60 are filtered. A pump 16, which is capable of introducing the solution 60 in the container 62 to the circulating path 14, and a filter 18, which is capable of filtering the impurities in the solution 60, are attached to the circulating path 14. The pump 16 sucks the impurities, which have been deposited at the bottom of the container 62, and introduces them to the circulating path 14 together with the solution 60. Then the solution 60 is filtered by the filter 18 and the filtered solution 60 is supplied to an upper part of the layer of the solution 60.

By the unit for cleaning the solution 60, the impurities, which have invaded the solution 60 when the magnetic disc 50 is dipped into the solution 60, can be removed, and the solution 60 can be cleaned.

Next, a unit for making the water 10 pure will be explained.

In the present embodiment, a supplying tube 20, which is capable of supplying the pure water 10 into the container 62, is inserted into the container 62. A front end of the supplying tube 20 is located in the solution 60 so as to supply the pure water 10 in a mid part of the layer of the solution 60. Since the specific gravity of the pure water 10 is less than that of the solution 60, the pure water 10 floats and forms the layer 10a on the surface of the layer of the solution 60.

In the present embodiment, the pure water 10 is continuously supplied. Maximum thickness of the layer 10a of the pure water 10 is equal to distance between the surface of the layer of the solution 60 and an inner edge of of an opening section 62a of the container 62. Amount of the solution n is almost fixed, so the maximum thickness of the layer 10a is also fixed. Thus, the pure water 10 overflows from the opening section 62a of the container 62.

When the lubricant layers are formed on the magnetic disc 50, firstly the magnetic disc 50 is passed through the layer of the pure water 10. The dusts and impurities stuck on the magnetic disc 50 are removed by the pure water 10, so the pure water 10 cleans the surfaces of the magnetic disc 50.

By continuously supplying the pure water 10 under the layer 10a, the dusts and the impurities are discharged together with the pure water 10, which overflows from the container 62, so that the pure water 10 in the layer 10a can be kept clean and the cleaning function of the pure water 10 can be kept. Since the dusts and the impurities, which have been stuck on the magnetic disc 50 or which have existed in the lubricant, are removed and discharged by the pure water 10, the purity of the solvent and the lubricant, or the whole solution 60 can be kept high.

Note that there is provided a gutter 22, which is capable of collecting and discharging the pure water 10 overflowed, on a side wall of the container 62 and near the opening section 6a.

Figure 6:
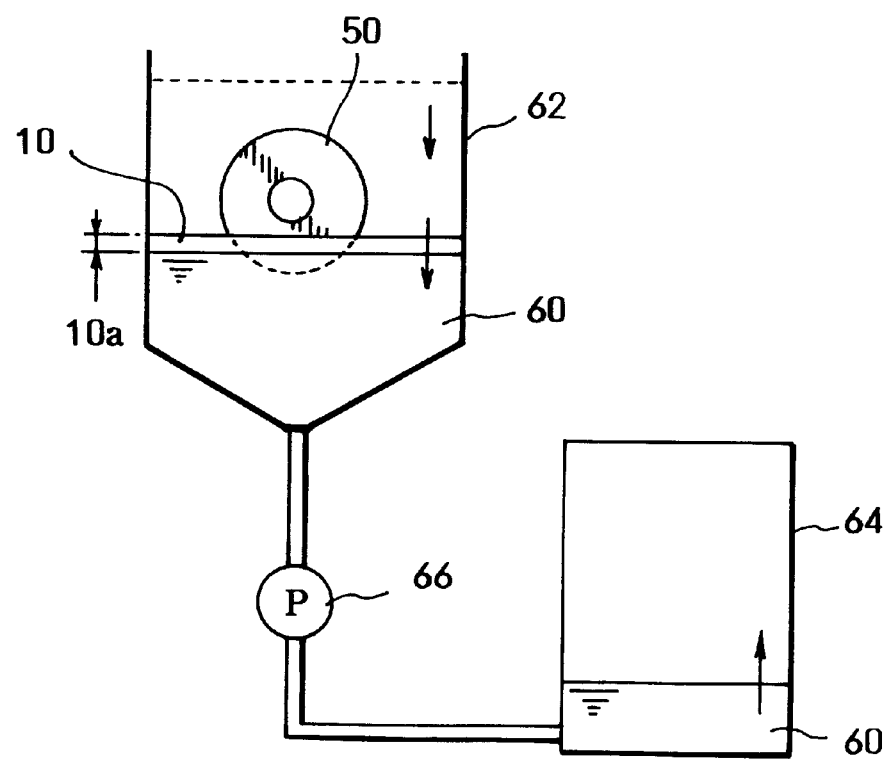
FIG. 6 is an explanation view showing a conventional device executing a surface descent-method.

In the above explanation, the device executes the dip-method; next, a device executing the surface descent-method will be explained with reference to FIG. 6, which shows the conventional device executing the surface descent-method. Note that elements described in the explanation of the conventional method are assigned the same numeric symbols and explanation will be omitted.

As well as the conventional device, the device comprises: the container 62 for accommodating the magnetic disc 50; the tank 64; and supplying-and-discharging means, e.g., the pump 66, which supplies the solution 60, etc. to into the container 62 in which the magnetic disc 50 has been accommodated, and which discharges and returns the solution 60, etc., which have been supplied into the container 62, to the tank 64.

In the present embodiment, both of the solution 60 and the pure water 10 are reservoired in the tank 64, so both are supplied into the container 62. The solution 60 and the pure water 10 are reservoired in one tank 64, but they maybe reservoired in two tanks respectively.

In the device, the magnetic disc 50 is vertically accommodated in the container 62, then the solution 60 and the pure water 10 are supplied into the container 62 from the tank 64 by the supplying-and-discharging means 66. The solution 60 and the pure water 10 mutually separate, and the layer 10a of the pure water 10 is formed on the surface of the layer of the solution 60. Enough amount of the solution 60 is supplied so as to completely dip the magnetic disc 50 therein.

After the magnetic disc 50 is dipped and the layer 10a is formed on the surface of the solution 60, the solution 60 and the pure water 10 are discharged from the container 66 and returned to the tank 64, by the supplying-and-discharging means 66, until the magnetic disc 50 is fully exposed. They are discharged to descend the level of the pure water layer 10a at fixed speed. With this action, the solution 60 is stuck on the surfaces of the magnetic disc 50 with uniform thickness, then the solvent volatilizes from the solution 60 on the magnetic disc 50, so that the lubricant layers are formed on the surfaces of the magnetic disc 50. If the solution 60 is solely discharged and the pure water 10 is left in the container 62, the layer 10a of the pure water 10 has been already formed in the container 62 when the solution 60 is newly supplied into the container 62. So the solution 60 can be supplied into the container 62 while maintaining the layer 10a by supplying the solution 60 under the layer 10a. By maintaining the water layer 10a, volatilizing the solvent from the solution 60 can be restricted as well as the dip-method.

In the dip-method and the surface descent-method, the solution 60, in which the lubricant is diluted with the solvent, is stuck on the magnetic disc 50 and the solvent is volatilized to form the lubricant layers thereon, so the total amount of the solution 60 in the device is gradually reduced.

It is convenient to automatically supply the solution 60 into the container 62.

Figure 2:
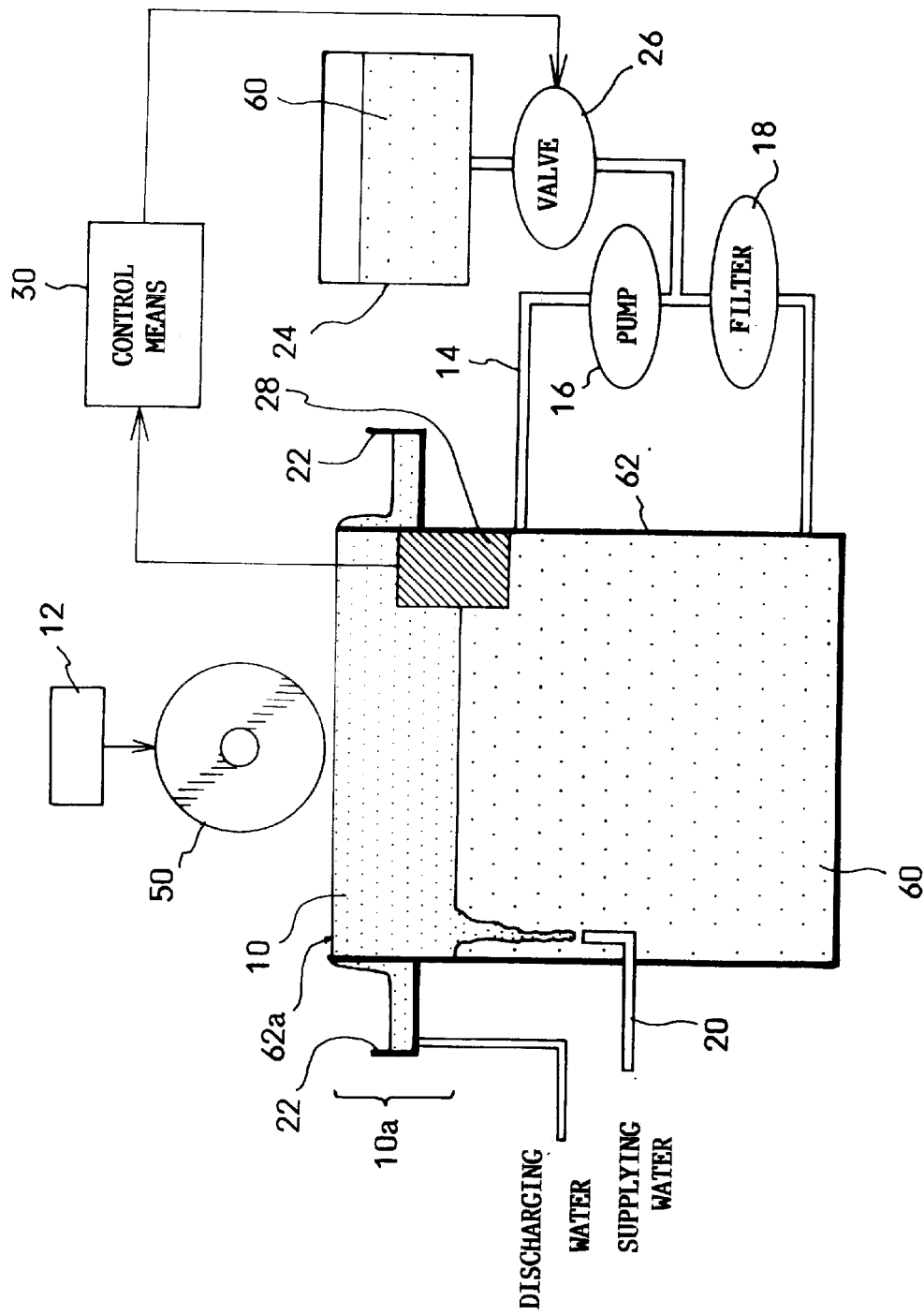
FIG. 2 is an explanation view of another example of the first embodiment.

The device capable of automatically supplying the solution 60 will be explained with reference to FIG. 2. Note that the device is realized by adding a mechanism for supplying the solution 60 into the container 62 to the device of the first embodiment, which executes the dip-method. So the elements described above are assigned the same numeric symbols and detail explanation will be omitted. Further, in the case of the device for the surface descent-method, the same mechanism may be added to the tank 64 to supply the solution 60 into the tank 64 and the container 62.

The supplying mechanism comprises: a tank 24 in which the solution 60 unused is reservoired; supplying means 26 for supplying the solution 60 unused from the tank 24 to the container 62; level detecting means 28 for detecting a level of the solution 60 in the container 62; and control means 30 for controlling the level of the solution 60 on the basis of the level thereof detected by the level detecting means 28, the control means 30 supplying the solution 60 unused into the container 62 by the supplying means 26 so as to make the level of the solution 60 close to a predetermined standard level.

In the present embodiment, a valve means is employed as the supplying means 26; the level detecting means 28 includes a float and a unit for detecting change of capacitance. The control means 30 is constituted by electric circuits including ICs, electric elements, microprocessor, etc.

Action of the supplying mechanism will be explained. The level detecting means 28 always detects the level of the solution 60 in the container 62, and transmits signals indicating the detected level thereof. The control means 30 compares the present level of the solution 60, which is detected by the level detecting means 28, with the standard level. If the the detected level of the solution 60 is lower than the standard level, the control means 30 opens the valve means 26 to supply the solution 60 unused from the tank 24 to the circulating path 14. As described above, the pump 16 in the circulating path 14 always draws the solution 60 in the container 62 to filter and return to the container 62, so the solution 60 unused is supplied into the container 62 together with the solution 60 filtered.

When the detected level reaches the standard level, the valve means 26 is closed to stop supplying the solution 60 unused.

By this action, the level of the solution 60 in the container 62 can be maintained the standard level.

Second Embodiment

To form the lubricant layers 58, which have fixed thickness, on the magnetic discs 50, change of the density of the lubricant in the solution 60 should be little, so the change of the density is detected and the lubricant and the solvent are supplied into the solution 60 so as to maintain the density at standard density.

Figure 3:
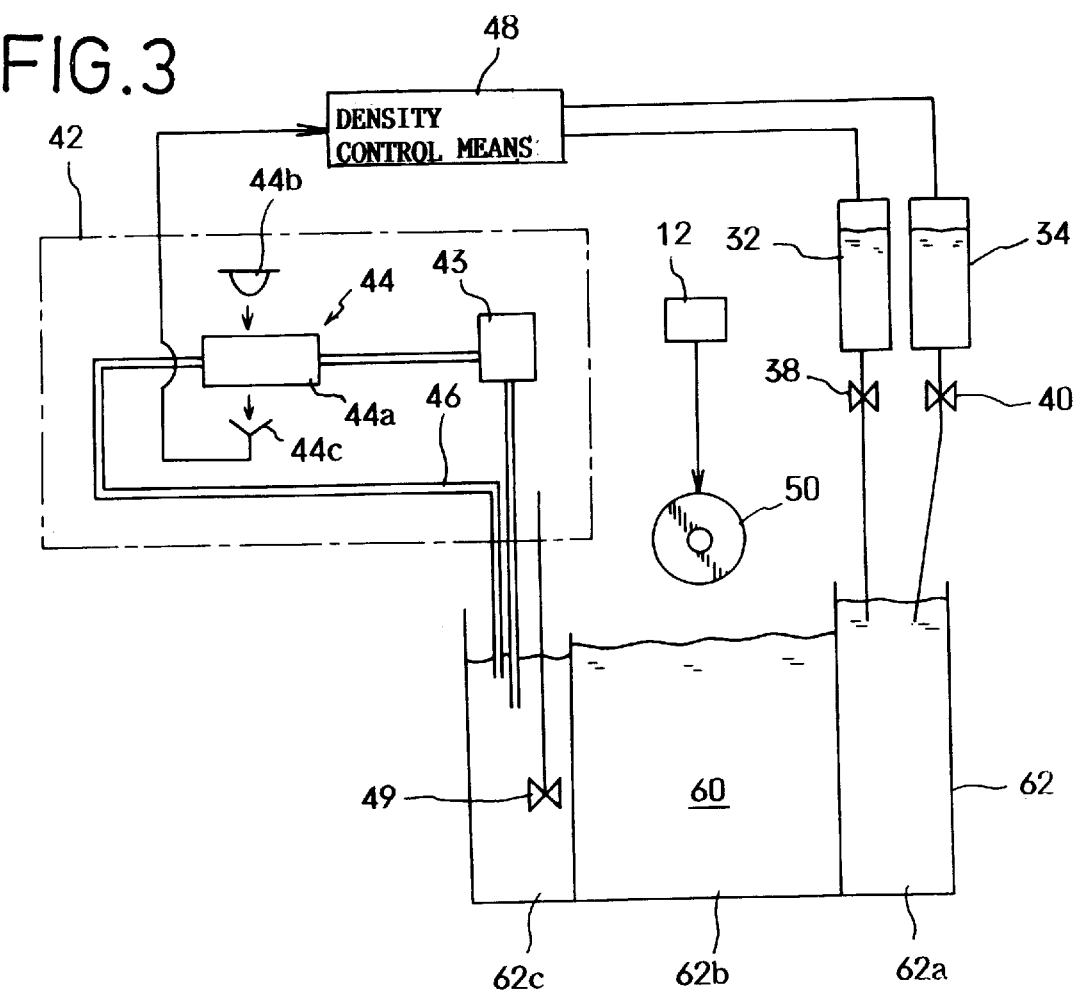
FIG. 3 is an explanation view of the device of a second embodiment of the present invention.
Figure 4:
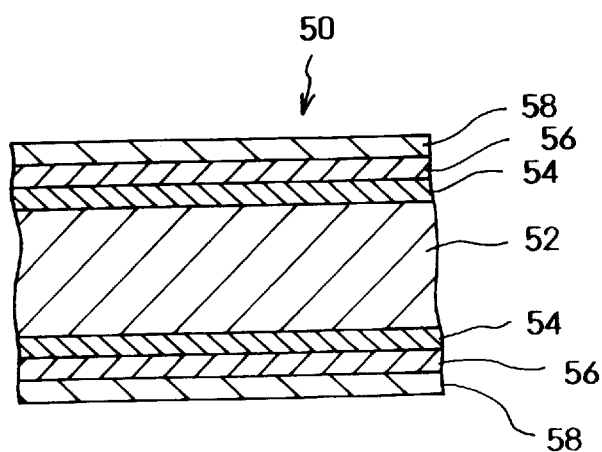
FIG. 4 is a partial sectional view of a magnetic disc.
Figure 5:
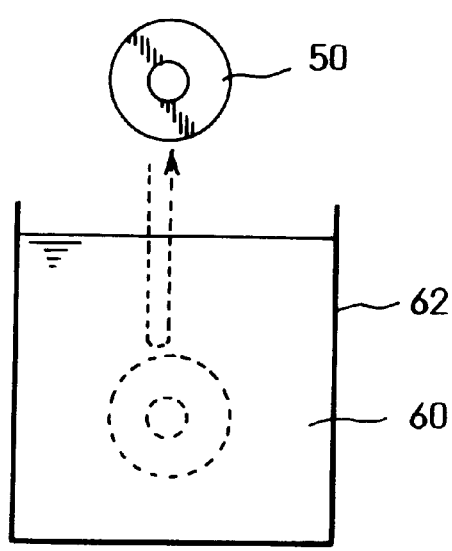
FIG. 5 is an explanation view showing a conventional device executing a dip-method.

The method of the present embodiment will be explained with reference to FIG. 3.

Firstly, the solution 60, in which the lubricant is diluted with the solvent and the density of the lubricant is adjusted to the predetermined standard density thereof, is reservoired in the container 62. Note that, the conventional lubricant and the conventional volatile solvent are used in the present embodiment.

The density of the lubricant in the solution 60 is detected, and the lubricant and/or the solvent is supplied into the container 62 so as to make the density of the lubricant close to predetermined standard density. By this action, the density of the lubricant in the solution 60 can be maintained at the standard density even if the solvent volatilizes from the surface of the solution 60 and the step of forming the lubricant layers is repeated many times.

By dipping the magnetic discs 50 in the solution 60 and pulling out the magnetic discs 50 from the solution 60 at fixed speed, the lubricant layers can be formed on the magnetic discs 50 with little change of the density of the lubricant in the solution 60, so that the lubricant layers formed on the magnetic discs 50 can uniformly have the predetermined thickness.

Next, the device executing the method of the present embodiment will be explained with reference to FIG. 3. Note that elements described in the explanation of the method are assigned the same numeric symbols and explanation will be omitted. The device executes the dip-method.

The solution 60 is reservoired in the container 62.

The conveying means 12 holds and dips the magnetic disc 50 into the solution 60 in the container 62, then takes out the magnetic disc 50 from the solution 60.

The lubricant unused is reservoired in a first tank 32.

The solvent unused is reservoired in a second tank 34.

First supplying means 38 supplies the lubricant unused from the first tank 32 to the container 62. The first supplying means 38 includes valve means and a pump.

Second supplying means 40 supplies the solvent unused from the second tank 34 to the container 62. The second supplying means 40 includes valve means and a pump.

Density detecting means 42 detects the density of the lubricant in the solution 60. The density detecting means 42 includes: a pump 43 for collecting a sample of the solution 60 from the container 62; a detecting section 44 for detecting the density of the lubricant in the sample, which has been collected by the pump 43; and a circulating path 46 for circulating the solution 60 from the container 62 to the container 62 via the pump 43 and the detecting section 44.

The detecting section 44 will be explained in detail. The detecting section 44 is provided in the circulating path 46. For example, the detecting section 44 includes: a measuring cell 44a made of quartz glass through which light can pass; a light source 44b capable of irradiating halogenous light to the measuring cell 44a; and a light receiving sensor 44c located on the opposite side of the measuring cell 44a from the light source 44b. With this structure, intensity of the light irradiated from the light source 44b, which irradiates the light receiving sensor 44c via the measuring cell 44a, is changed when the density of the lubricant in the solution 60 is changed, so that output signals of the light receiving sensor 44c are changed according to the change of the density.

Density control means 48 detects the present density of the lubricant in the solution 60 on the basis of the output signals of the density detecting means 42. Then the density control means 48 compares the detected density with the predetermined standard density. And the density control means 48 controls the first supplying means 38 and the second supplying means 40 so as to make the detected density close to the standard density. If the detected density is less than the standard density, the lubricant is supplied from the first tank 32 to the container 62 by the first supplying means 38; if the detected density is greater than the standard density, the solvent is supplied from the second tank 34 to the container 62 by the second supplying means 40. In some cases, the lubricant and the solvent are simultaneously supplied to the container 62 to make the detected density close to the standard density.

Figure 7:
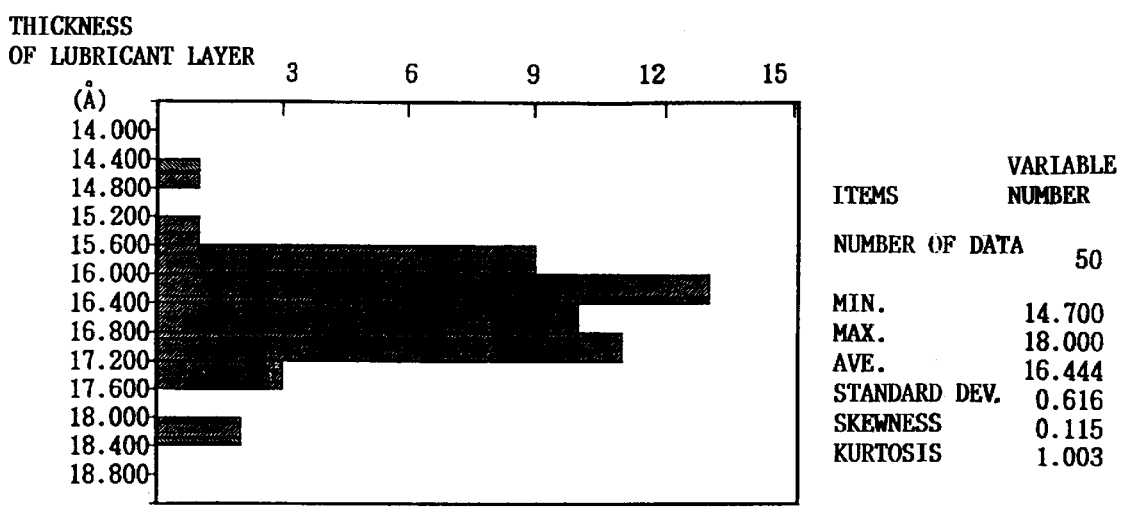
FIG. 7 is a graph showing dispersion of thickness of lubricant layers, which are formed by the method and the device for executing the dip-method shown in FIG. 5.
Figure 8:
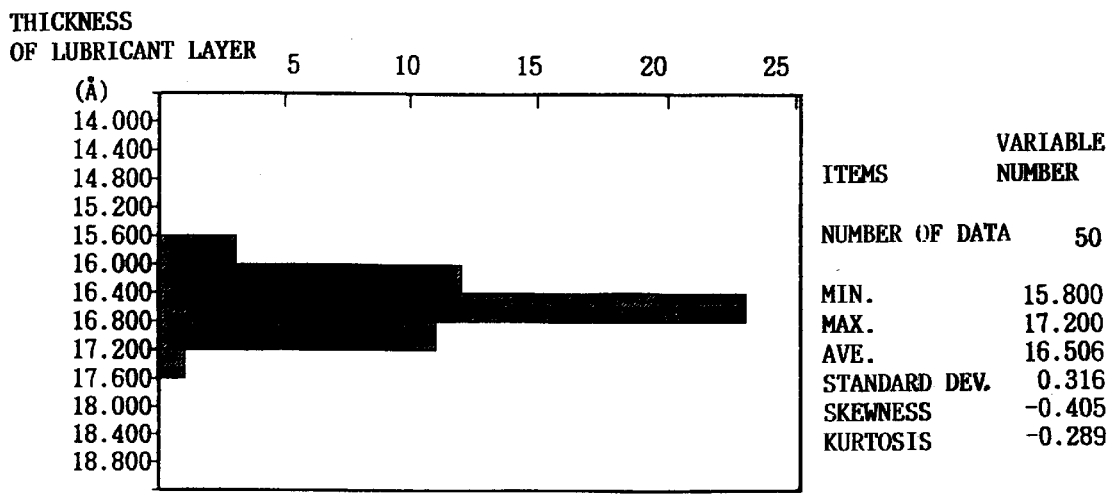
FIG. 8 is a graph showing dispersion of thickness of lubricant layers, which are formed by the method and the device of the present invention, which execute the dip-method.

With above described structure, the device of the present embodiment is capable of maintaining the density of the lubricant 60 in the container 62 at the standard density. Even if the step of forming the lubricant layers on the magnetic discs 50 is repeated many times, the thickness of the lubricant layers 58 on the magnetic discs 50 can be made to have the same thickness. Dispersion of the thickness of the lubricant layers 58, which are formed in the solution whose density was maintained, is shown in FIG. 8; dispersion of the thickness of the lubricant layers 58, which are formed in the conventional device, is shown in FIG. 7. As clearly shown in the graphs, the dispersion of the present embodiment is much less than that of the conventional device.

In the present embodiment, agitating blades 49 are provided in the container 62 and located in the vicinity of an inlet-end of a pipe 46 of the density detecting means 42 so as to properly mix the lubricant with the solvent, so that the density of the lubricant can be correctly detected. But the agitating blades 49 are not essential members. The container 62 includes: a front tub section 62a into which the unused lubricant and solvent are supplied from the first tank 32 and the second tank 34 and in which the solution 60 is made by diluting the lubricant with the solvent; a processing tub section 62b into which the solution 60 is introduced from the front tub section 62a and in which the magnetic disc 50 is dipped into the solution 60; and a rear tub section 62c into which the solution 60, which has overflowed from the processing tub section 62b, is introduced and in which the lubricant and the solvent are agitated, by the agitating blades 49, so as to prepare the sample for the density detecting means 42. Note that the rear tub section 62c may be omitted, and the sample for the density detecting means 42 may be collected in the processing tub section 62b.

In the First Embodiment, volatilizing the solvent in the solution 60 is restricted and the change of the density of the lubricant in the solution 60 is restricted, so that the the lubricant layers 58 on the magnetic discs 50 can have fixed thickness; in the Second Embodiment, volatilizing the solvent in the solution 60 is allowed but the lubricant and the solvent are added to maintain the density of the lubricant in the solution 60, so that the lubricant layers 58 on the magnetic discs 50 can have fixed thickness. Further, the features of the First and the Second Embodiments may be combined. Namely, volatilizing the solvent in the solution 60 is restricted, and the density of the lubricant in the solution 60 are detected so as to precisely add the lubricant and the solvent to maintain the desired density, so that the lubricant layers 58 on the magnetic discs 50 can have fixed thickness with higher accuracy.

The combined structure will be briefly explained. Note that, elements described in the First and the Second Embodiments are assigned the same numeric symbols and detail explanation will be omitted.

Following elements are added to the device of the First Embodiment shown in FIG. 1.

Namely, the first tank 32 in which the lubricant unused is reservoired, the second tank 34 in which the solvent unused is reservoired, the first supplying means 38 for supplying the lubricant unused from the first tank 32 to the container 62, the second supplying means 40 for supplying the solvent unused from the second tank 34 to the container 62, and the density detecting means 42 for detecting density of the Lubricant in the solution 60 are added to the device shown in FIG. 1. They are structural elements of the device of the Second Embodiment.

Further, the level detecting means 28 for detecting the level of the solution 60 in the container 62 is added. The level detecting means 28 explained in the First Embodiment and shown in FIG. 2 may be employed.

The density detecting means 42 compares the detected density with the predetermined standard density so as to make the detected density close to the standard density. Similarly, the control means controls the level of the solution 60 by comparing the detected level of the solution with the predetermined standard level thereof, and the control means supplies the lubricant and/or the solvent into the container 62 by the first supplying means 38 and/or the second supplying means 40 so as to make the density of the lubricant close to the standard level.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of forming a lubricant layer on a magnetic disc, comprising the steps of:

dipping said magnetic disc into a solution in which a lubricant is diluted with volatile solvent;

taking out said magnetic disc from said solution; and volatilizing the volatile solvent from a surface of said magnetic disc, wherein a layer of specific liquid, whose specific gravity is less than that of said solution and which is less volatile and insoluble in said solution, is formed on a surface of said solution.

2. The method according to claim 1, wherein said specific liquid is pure water.

3. A method of forming a lubricant layer on a magnetic disc, comprising the steps of:

dipping said magnetic disc into a solution in which a lubricant is diluted with volatile solvent;

taking out said magnetic disc from said solution; and volatilizing the volatile solvent from a surface of said magnetic disc, characterized by:

detecting density of said lubricant in said solution; and supplying said lubricant and/or said solvent into said solution so as to make the density of said lubricant close to predetermined standard density.

* * * * *